US009233513B2

(12) United States Patent
Pugh et al.

(10) Patent No.: US 9,233,513 B2
(45) Date of Patent: Jan. 12, 2016

(54) APPARATUS FOR MANUFACTURING STACKED INTEGRATED COMPONENT MEDIA INSERTS FOR OPHTHALMIC DEVICES

(75) Inventors: Randall B. Pugh, Jacksonville, FL (US); Frederick A. Flitsch, New Windsor, NY (US); Daniel B. Otts, Fruit Cove, FL (US); James Daniel Riall, St. Johns, FL (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 27 days.

(21) Appl. No.: 13/358,571

(22) Filed: Jan. 26, 2012

(65) Prior Publication Data

US 2012/0234493 A1    Sep. 20, 2012

Related U.S. Application Data

(60) Provisional application No. 61/454,205, filed on Mar. 18, 2011, provisional application No. 61/454,591, filed on Mar. 21, 2011.

(51) Int. Cl.
| | |
|---|---|
| *B29D 11/00* | (2006.01) |
| *B32B 38/18* | (2006.01) |
| *G02C 7/04* | (2006.01) |
| *G02C 7/08* | (2006.01) |
| *G02C 7/02* | (2006.01) |

(52) U.S. Cl.
CPC .... *B29D 11/00826* (2013.01); *B29D 11/00817* (2013.01); *B32B 38/1841* (2013.01); *G02C 7/04* (2013.01); *G02C 7/083* (2013.01)

(58) Field of Classification Search
CPC ............. G02C 7/083; B29D 11/00826; B29D 11/00817; B29D 11/00807; B65D 85/02; B29C 31/008; B32B 3/266; B32B 38/266; B32B 38/1841
USPC ........ 156/559, 563, 556; 351/159.03, 159.39, 351/159.4; 623/6.22, 909
See application file for complete search history.

(56) References Cited

U.S. PATENT DOCUMENTS

| | | | | |
|---|---|---|---|---|
| 3,291,296 | A | * | 12/1966 | Lemkelde ..................... 206/303 |
| 4,592,944 | A | | 6/1986 | Clark et al. |
| 4,601,545 | A | | 7/1986 | Kern |
| 5,478,420 | A | * | 12/1995 | Gauci et al. ................ 156/89.17 |
| 5,712,721 | A | | 1/1998 | Large |

(Continued)

FOREIGN PATENT DOCUMENTS

| | | |
|---|---|---|
| EP | 1760515 A2 | 3/2007 |
| WO | WO 2007050402 A2 | 5/2007 |

(Continued)

OTHER PUBLICATIONS

PCT Written Opinion for PCT Int'l Appln. No. PCT/US2013/023182.

(Continued)

*Primary Examiner* — William Bell

(57) ABSTRACT

This invention discloses methods and apparatus for providing a media insert with an energy source to an ophthalmic lens. The energy source is capable of powering a component included within the ophthalmic lens. In some embodiments, an ophthalmic lens is cast molded from a silicone hydrogel and the component includes an electro-optical lens portion.

8 Claims, 12 Drawing Sheets

(56) References Cited

U.S. PATENT DOCUMENTS

| | | | |
|---|---|---|---|
| 6,322,589 B1 | 11/2001 | Cumming | |
| 6,924,036 B2 * | 8/2005 | Polastri et al. | 428/422 |
| 7,404,636 B2 | 7/2008 | Blum et al. | |
| 7,410,700 B2 | 8/2008 | Wang | |
| 7,798,301 B2 | 9/2010 | Keating et al. | |
| 8,343,216 B2 | 1/2013 | Brady et al. | |
| 8,579,435 B2 | 11/2013 | Blum et al. | |
| 2002/0058151 A1 | 5/2002 | Uchikoba et al. | |
| 2002/0162631 A1 * | 11/2002 | Wien et al. | 156/391 |
| 2003/0069666 A1 * | 4/2003 | Nagler | 700/219 |
| 2003/0137922 A1 * | 7/2003 | Ro et al. | 369/283 |
| 2004/0131925 A1 | 7/2004 | Jenson et al. | |
| 2005/0099594 A1 | 5/2005 | Blum et al. | |
| 2005/0255079 A1 | 11/2005 | Santerre et al. | |
| 2006/0026201 A1 | 2/2006 | Cabillic | |
| 2006/0095128 A1 | 5/2006 | Blum et al. | |
| 2006/0202359 A1 * | 9/2006 | Chen | 257/797 |
| 2006/0265058 A1 | 11/2006 | Silvestrini | |
| 2007/0159562 A1 | 7/2007 | Haddock et al. | |
| 2007/0242173 A1 | 10/2007 | Blum et al. | |
| 2008/0086206 A1 | 4/2008 | Nasiatka et al. | |
| 2008/0208335 A1 | 8/2008 | Blum et al. | |
| 2008/0261390 A1 | 10/2008 | Chen et al. | |
| 2009/0003383 A1 | 1/2009 | Watanabe et al. | |
| 2009/0033863 A1 | 2/2009 | Blum et al. | |
| 2009/0046349 A1 | 2/2009 | Haddock et al. | |
| 2009/0050267 A1 * | 2/2009 | Conlon et al. | 156/312 |
| 2009/0091818 A1 | 4/2009 | Haddock et al. | |
| 2009/0204207 A1 | 8/2009 | Blum et al. | |
| 2009/0243125 A1 | 10/2009 | Pugh et al. | |
| 2009/0244477 A1 | 10/2009 | Pugh et al. | |
| 2009/0256977 A1 | 10/2009 | Haddock et al. | |
| 2010/0001926 A1 | 1/2010 | Amirparviz et al. | |
| 2010/0002190 A1 | 1/2010 | Clarke et al. | |
| 2010/0072643 A1 | 3/2010 | Pugh | |
| 2010/0073534 A1 | 3/2010 | Yano et al. | |
| 2010/0076553 A1 | 3/2010 | Pugh et al. | |
| 2010/0078838 A1 | 4/2010 | Pugh et al. | |
| 2010/0079724 A1 | 4/2010 | Pugh | |
| 2010/0110372 A1 | 5/2010 | Pugh et al. | |
| 2011/0045112 A1 | 2/2011 | Pugh et al. | |
| 2011/0074281 A1 | 3/2011 | Farquhar et al. | |
| 2011/0230963 A1 | 9/2011 | Cuevas | |
| 2012/0092612 A1 | 4/2012 | Binder | |
| 2012/0245444 A1 | 9/2012 | Otis et al. | |
| 2013/0194540 A1 | 8/2013 | Pugh et al. | |
| 2013/0245755 A1 | 9/2013 | Fehr et al. | |
| 2014/0036226 A1 | 2/2014 | Blum et al. | |
| 2014/0148899 A1 | 5/2014 | Fehr et al. | |

FOREIGN PATENT DOCUMENTS

| | | | |
|---|---|---|---|
| WO | WO 2010051225 A1 | | 5/2010 |
| WO | WO 2010133317 A1 * | | 11/2010 |
| WO | WO 2011/163080 A1 | | 12/2011 |

OTHER PUBLICATIONS

Pandey, J.; Yu-Te Liao; Lingley, A.; Mirjalili, R.; Parviz, B.; Otis, B.P., "A Fully Integrated RF-Powered Contact Lens With a Single Element Display," Biomedical Circuits and Systems, IEEE Transactions on , vol. 4, No. 6, pp. 454, 461, Dec. 2010.

Ratta, Varun "Crystallization, Morphology, Thermal Stability and Adhesive Properties of Novel High Performance Semicrystalline Polyimides" PhD Dissertation defended Apr. 26, 1999 Virginia Tech Unversity, entire Chapter 4.

European Search Report for Application No. EP 13 15 6410 Date of Completion of Report Jun. 5, 2013.

International Search Report for PCT PCT/US2012/026849 Date of Jul. 2, 2012.

PCT International Search Report, dated Oct. 2, 2012 for PCT Int'l Appln. No. PCT/US2012/029769.

* cited by examiner

```
┌─────────────────────────────────────────┐
│   PLACE A MEDIA INSERT WITH AN ENERGY   │
│    SOURCE WITHIN AN OPHTHALMIC LENS     │
│                                     501 │
└─────────────────────────────────────────┘
                    │
┌─────────────────────────────────────────┐
│  PLACE THE ENERGY SOURCE IN ELECTRICAL  │
│   COMMUNICATION WITH A COMPONENT        │
│   INCORPORATED INTO THE OPHTHALMIC      │
│                 LENS                    │
│                                     502 │
└─────────────────────────────────────────┘
                    │
┌─────────────────────────────────────────┐
│    DIRECT THE RECEIVED ENERGY TO A      │
│  COMPONENT INCORPORATED INTO THE        │
│          OPHTHALMIC LENS                │
│                                     503 │
└─────────────────────────────────────────┘
                    │
┌─────────────────────────────────────────┐
│     PERFORM AN ACTION BASED UPON THE    │
│  TRANSFER OF ENERGY TO THE COMPONENT    │
│                                     504 │
└─────────────────────────────────────────┘
                    │
┌─────────────────────────────────────────┐
│   TRANSMIT INFORMATION BASED UPON THE   │
│           ACTION PERFORMED              │
│                                     505 │
└─────────────────────────────────────────┘
```

FIG. 5

APPARATUS FOR MANUFACTURING STACKED INTEGRATED COMPONENT MEDIA INSERTS FOR OPHTHALMIC DEVICES

RELATED APPLICATIONS

This application claims priority to U.S. Provisional Application Ser. No. 61/454,205 filed on Mar. 18, 2011; and U.S. Provisional Application Ser. No. 61/454,591 filed on Mar. 21, 2011; the contents of which are relied upon and incorporated by reference.

FIELD OF USE

This invention describes an energized media insert for an ophthalmic device and, more specifically, in some embodiments, the fabrication of an ophthalmic lens with an energized media insert.

BACKGROUND

Traditionally an ophthalmic device, such as a contact lens, an intraocular lens or a punctal plug included a biocompatible device with a corrective, cosmetic or therapeutic quality. A contact lens, for example, can provide one or more of: vision correcting functionality; cosmetic enhancement; and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics are accomplished without the lens entering into an energized state.

More recently, it has been theorized that active components may be incorporated into a contact lens. Some components can include semiconductor devices. Some examples have shown semiconductor devices embedded in a contact lens placed upon animal eyes. However, such devices lack a free standing energizing mechanism. Although wires may be run from a lens to a battery to power such semiconductor devices, and it has been theorized that the devices may be wirelessly powered, no mechanism for such wireless power has been available.

It is desirable therefore to have additional methods and apparatus conducive to the formation of ophthalmic lenses that are energized to an extent suitable for providing one or more of functionality into an ophthalmic lens and a controlled change in optical characteristic of an ophthalmic lens or other biomedical device.

SUMMARY

Accordingly, the present invention includes a media insert that can be energized and incorporated into an ophthalmic device, such as, for example a contact lens or a punctal plug. In addition, methods and apparatus for forming an ophthalmic lens, with an energized media insert are presented. In some embodiments, the media in an energized state is capable of powering a component capable of drawing a current. Components may include, for example, one or more of: a variable optic lens element, a semiconductor device and an active or passive electronic device. Some embodiments can also include a cast molded silicone hydrogel contact lens with a rigid or formable energized insert contained within the ophthalmic lens in a biocompatible fashion.

The present invention therefore includes disclosure of an ophthalmic lens with an energized media portion, apparatus for forming an ophthalmic lens with an energized media portion and methods for the manufacturing the same. An energy source can be deposited onto a media insert and the insert can be placed in proximity to one, or both of, a first mold part and a second mold part. A reactive monomer mix is placed between the first mold part and the second mold part. The first mold part is positioned proximate to the second mold part thereby forming a lens cavity with the energized media insert and at least some of the reactive monomer mix in the lens cavity; the reactive monomer mix is exposed to actinic radiation to form an ophthalmic lens. Lenses are formed via the control of actinic radiation to which the reactive monomer mixture is exposed.

DESCRIPTION OF THE DRAWINGS

FIG. 5 illustrates method steps according to some additional aspect of the present invention.

DETAILED DESCRIPTION OF THE INVENTION

Figure 1:
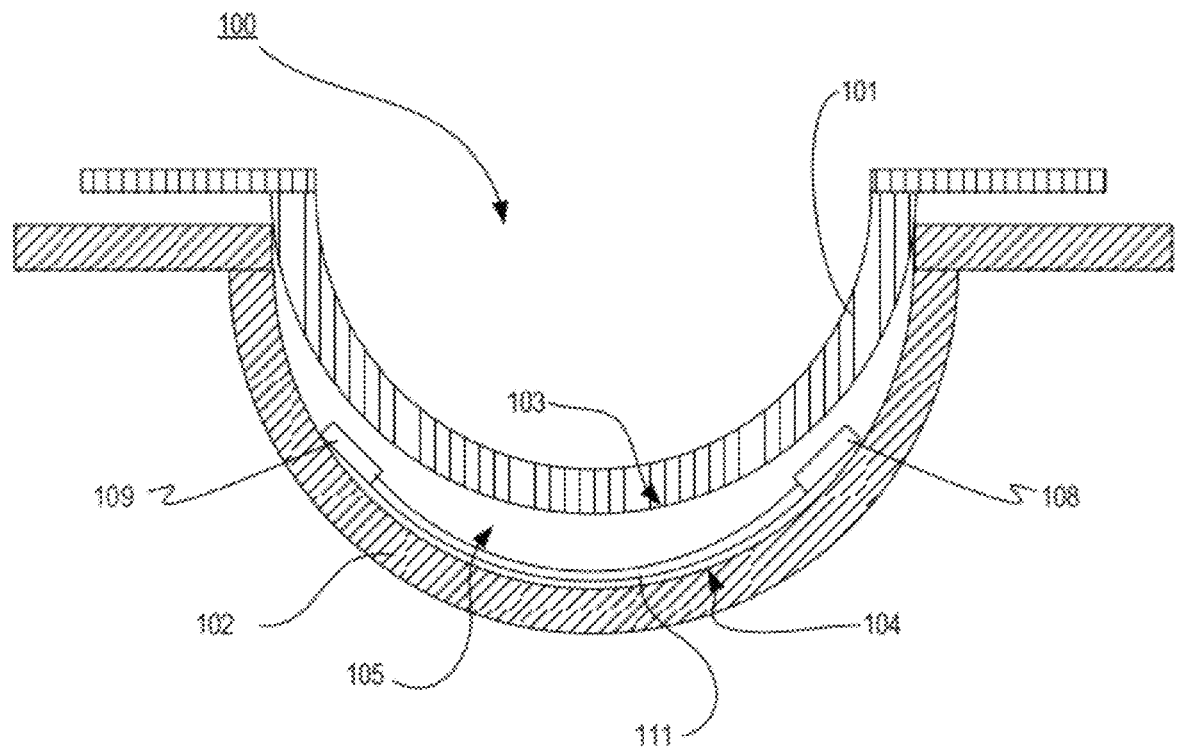
FIG. 1 illustrates a mold assembly apparatus according to some embodiments of the present invention.

The present invention includes methods and apparatus for manufacturing an ophthalmic lens with an energized media insert. In addition, the present invention includes an ophthalmic lens with a media insert incorporated into the ophthalmic lens.

According to the present invention an energized lens 100 is formed with an embedded Media Insert and an Energy Source, such as an electrochemical cell or battery as the storage means for the energy and in some embodiments, encapsulation and isolation of the materials comprising the Energy Source from an environment into which an ophthalmic lens is placed.

In some embodiments, a Media Insert also includes a pattern of circuitry, components and Energy Sources. Various embodiments can include the Media Insert locating the pattern of circuitry, components and Energy Sources around a periphery of an optic zone through which a wearer of a lens would see, while other embodiments can include a pattern of circuitry, components and Energy Sources which are small enough to not adversely affect the sight of a contact lens wearer and therefore the Media Insert can locate them within, or exterior to, an optical zone.

In general, according to some embodiments of the present invention, a Media Insert is embodied within an ophthalmic lens via automation which places an Energy Source a desired location relative to a mold part used to fashion the lens.

In some embodiments, an Energy Source is placed in electrical communication with a component which can be activated on command and draws electrical current from the Energy Source included within the ophthalmic lens. A component can include for example, a semiconductor device, an active or passive electrical device or an electrically activated machine, including for example: Microelectromechanical systems (MEMS), nanoelectromechanical systems (NEMS), or micromachines. Subsequent to placing the Energy Source and component, a Reactive Mixture can be shaped by the mold part and polymerized to form the ophthalmic lens.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Component: as used herein refers to a device capable of drawing electrical current from an Energy Source to perform one or more of a change of logical state or physical state.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Lens: refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses and made from silicone elastomers or hydrogels.

Lens forming mixture or "Reactive Mixture" or "RMM" (reactive monomer mixture): as used herein refers to a monomer or prepolymer material which can be cured and crosslinked or crosslinked to form an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

Lens Forming Surface: refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: refers to an electrochemical cell where Lithium ions move through the cell to generate electrical energy. This electrochemical cell, typically called a battery, may be reenergized or recharged in its typical forms.

Media Insert: as used herein refers to a formable or rigid substrate capable of supporting an Energy Source within an ophthalmic lens. In some embodiments, the Media Insert also supports one or more components.

Mold: refers to a rigid or semi-rigid object that may be used to form lenses from uncured formulations. Some preferred molds include two mold parts forming a front curve mold part and a back curve mold part.

Optical Zone: as used herein refers to an area of an ophthalmic lens through which a wearer of the ophthalmic lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: To restore to a state with higher capacity to do work. Many uses within this invention may relate to restoring a device to the capability to flow electrical current at a certain rate for a certain, reestablished time period.

Released from a mold: means that a lens is either completely separated from the mold, or is only loosely attached so that it can be removed with mild agitation or pushed off with a swab.

"Stacked Integrated Component Devices" as used herein and sometimes referred to as "SIC-Devices", refers to the product of packaging technologies that can assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device production technologies to fit and assume various contours as it may be desired.

Molds

Referring now to FIG. 1, a diagram of an exemplary mold device 100 for an ophthalmic lens is illustrated with a Media Insert 111. As used herein, the terms a mold device 100 includes a plastic formed to shape a cavity 105 into which a lens forming mixture can be dispensed such that upon reaction or cure of the lens forming mixture, an ophthalmic lens of a desired shape is produced. The molds and mold assemblies 100 of this invention are made up of more than one "mold parts" or "mold pieces" 101-102. The mold parts 101-102 can be brought together such that a cavity 105 is formed between the mold parts 101-102 in which a lens can be formed. This combination of mold parts 101-102 is preferably temporary. Upon formation of the lens, the mold parts 101-102 can again be separated for removal of the lens.

At least one mold part 101-102 has at least a portion of its surface 103-104 in contact with the lens forming mixture such that upon reaction or cure of the lens forming mixture that surface 103-104 provides a desired shape and form to the portion of the lens with which it is in contact. The same is true of at least one other mold part 101-102.

Thus, for example, in a preferred embodiment a mold device 100 is formed from two parts 101-102, a female concave piece (front piece) 102 and a male convex piece (back piece) 101 with a cavity formed between them. The portion of the concave surface 104 which makes contact with lens forming mixture has the curvature of the front curve of an ophthalmic lens to be produced in the mold device 100 and is sufficiently smooth and formed such that the surface of an ophthalmic lens formed by polymerization of the lens forming mixture which is in contact with the concave surface 104 is optically acceptable.

In some embodiments, the front mold piece 102 can also have an annular flange integral with and surrounding circular circumferential edge and extends from it in a plane normal to the axis and extending from the flange (not shown).

A lens forming surface can include a surface 103-104 with an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

At 111, a Media Insert is illustrated onto which an Energy Source 109 and a Component 108 are mounted. The Media Insert 111 may be any receiving material onto which an Energy Source 109 may be placed, in some embodiments may also include circuit paths, components and other aspects useful to place the Energy Source 109 in electrical communication with the Component 108 and enable the Component to draw an electrical current from the Energy Source 109.

In some embodiments, the Media Insert 111 includes a flexible substrate. Additional embodiments can include a Media Insert 111 that is rigid, such as a silicon wafer. In some embodiments, a rigid insert may include an optical zone providing an optical property (such as those utilized for vision correction) and a non-optical zone portion. An Energy Source can be placed on one or both of the optic zone and non-optic zone of the insert. Still other embodiments can include an annular insert, either rigid or formable or some shape which circumvents an optic zone through which a user sees.

Other embodiments include a Media Insert 111 formed of a clear coat of a material which be incorporated into a lens when the lens is formed. The clear coat can include for example a pigment as described below, a monomer or other biocompatible material.

Various embodiments also include placing an Energy Source 109 onto Media Insert 111 prior to placement of the Media Insert 111 into a mold portion used to form a lens. The Media Insert 111 may also include one or more components which will receive an electrical charge via the Energy Source 109.

In some embodiments, a lens with a Media Insert 111 can include a rigid center soft skirt design in which a central rigid optical element is in direct contact with the atmosphere and the corneal surface on respective an anterior and posterior surfaces, wherein the soft skirt of lens material (typically a hydrogel material) is attached to a periphery of the rigid optical element and the rigid optical element also acts as a Media Insert providing energy and functionality to the resulting ophthalmic lens.

Some additional embodiments include a Media Insert 111 that is a rigid lens insert fully encapsulated within a hydrogel matrix. A Media Insert 111 which is a rigid lens insert may be manufactured, for example using microinjection molding technology. Embodiments can include, for example, a poly (4-methylpent-1-ene copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm and a front surface radius of about 7.9 mm and a rear surface radius of about 7.8 mm and a center thickness of about 0.100 mm and an edge profile of about 0.050 radius. One exemplary micromolding machine can include the Microsystem 50 five-ton system offered by Battenfield Inc.

The Media Insert can be placed in a mold part 101-102 utilized to form an ophthalmic lens.

Mold part 101-102 material can include, for example: a polyolefin of one or more of: polypropylene, polystyrene, polyethylene, polymethyl methacrylate, and modified polyolefins. Other molds can include a ceramic or metallic material.

Other mold materials that may be combined with one or more additives to form an ophthalmic lens mold include, for example, Zieglar-Natta polypropylene resins (sometimes referred to as znPP); a clarified random copolymers for clean molding as per FDA regulation 21 CFR (c) 3.2; a random copolymer (znPP) with ethylene group.

Still further, in some embodiments, the molds of the invention may contain polymers such as polypropylene, polyethylene, polystyrene, polymethyl methacrylate, modified polyolefins containing an alicyclic moiety in the main chain and cyclic polyolefins. This blend can be used on either or both mold halves, where it is preferred that this blend is used on the back curve and the front curve consists of the alicyclic co-polymers.

In some preferred methods of making molds 100 according to the present invention, injection molding is utilized according to known techniques, however, embodiments can also include molds fashioned by other techniques including, for example: lathing, diamond turning, or laser cutting.

Typically, lenses are formed on at least one surface of both mold parts 101-102. However, in some embodiments, one surface of a lens may be formed from a mold part 101-102 and another surface of a lens can be formed using a lathing method, or other methods.

Lenses

Figure 2A:
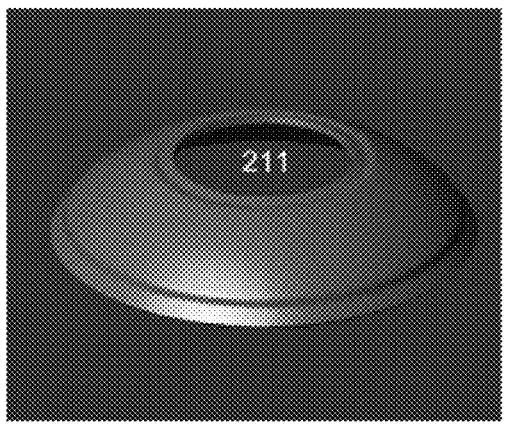
FIG. 2A-2D illustrates various embodiments of a media insert which can be placed within an ophthalmic lens.
Figure 2B:
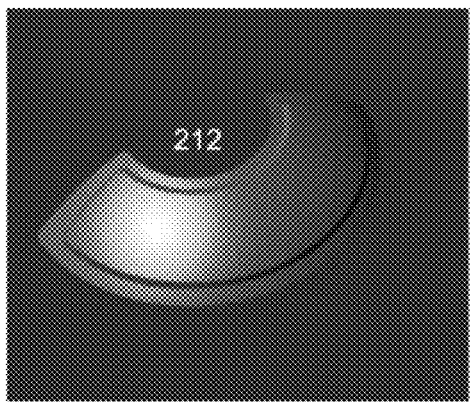
Figure 2C:
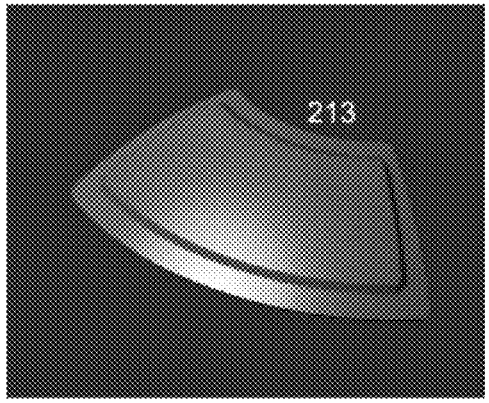
Figure 2D:
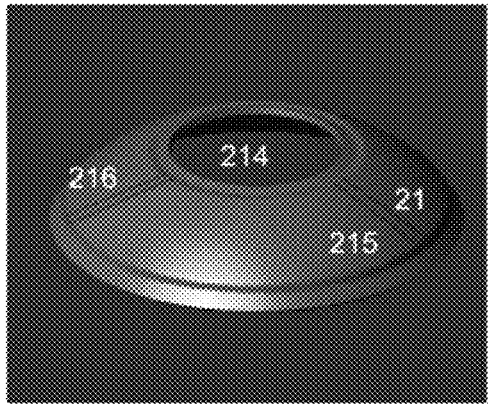

Referring now to FIG. 2A-2D, exemplary designs of Media Inserts 211-214 are illustrated. FIG. 2A illustrates an annular Media Insert 211. Other Media Inserts may be of various shapes conducive to placement with an ophthalmic lens. Some preferred shapes include shapes with arcuate designs matching a portion of the overall shape of the ophthalmic lens. FIG. 2B illustrates a Media Insert 212 which includes an area of about ½ of an full annular design and also includes an arcuate area which may surround an optic zone of a lens into which the Media Insert 212 is placed. Similarly, FIG. 2C includes a Media insert 213 of about ⅓ of an annular design. FIG. 2D illustrates an annular design 214 with multiple discrete portions 215,216,21 of the Media Insert 214. Discrete portions 215,216,21 can be useful to isolate various functions attributed to the individual portions 215,216,21. For example, one discrete portion 215,216,21 may contain one or more Energy Sources and another discrete portion 215,216,21 may include components.

In some embodiments, a Media Insert 211-214 may have an optic zone that includes a variable optic powered by an Energy Source located on the Media Insert 211-214. The Media Insert 211-214 can also include circuitry to control the variable optic included in the optic zone 211-214. In this discussion, a variable optic can be considered a component.

An Energy Source can be in electrical communication with a component. The component can include any device which responds to an electrical charge with a change in state, such as, for example: a semiconductor type chip; a passive electrical device; or an optical device such as a crystal lens.

In some specific embodiments, an Energy Source includes, for example: battery or other electrochemical cell; capacitor; ultracapacitor; supercapacitor; or other storage component. Some specific embodiments can include a lithium ion battery located on a Media Insert 211-214 on the periphery of an ophthalmic lens outside of the optic zone and chargeable via one or more of radio frequency and magnetic inductance into an Energy Source deposited via ink jetting.

In some embodiments, a preferred lens type can include a lens that includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Suitable silicone containing components include compounds of Formula I

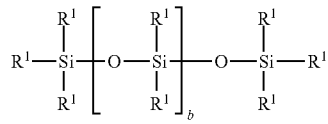

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

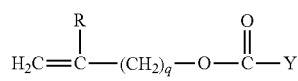

Formula II wherein: Y denotes —O—, —S— or —NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and

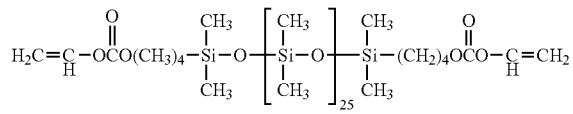

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

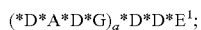

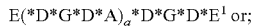

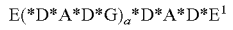  Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
$a$ is at least 1;
A denotes a divalent polymeric radical of formula:

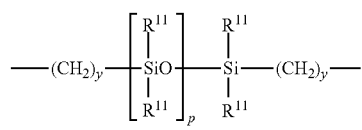

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

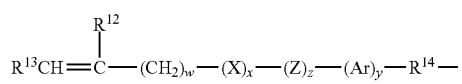

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

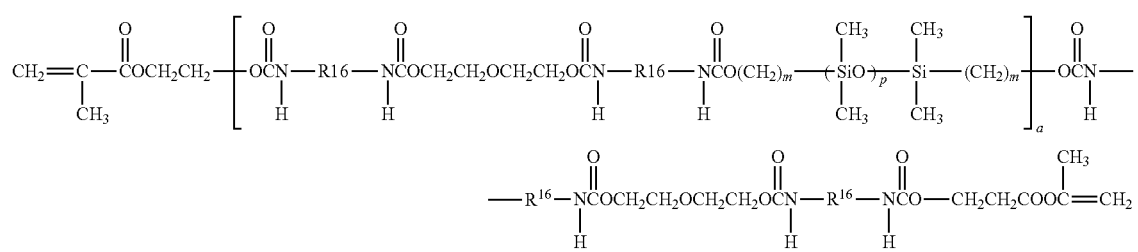

Formula IX wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

some of the reactive monomer mix and the Energy Source in the cavity. At 405, the reactive monomer mix within the cavity can be polymerized. Polymerization can be accomplished for example via exposure to one or both of actinic radiation and heat. At 406, the lens is removed from the mold parts.

Although invention may be used to provide hard or soft contact lenses made of any known lens material, or material Formula X

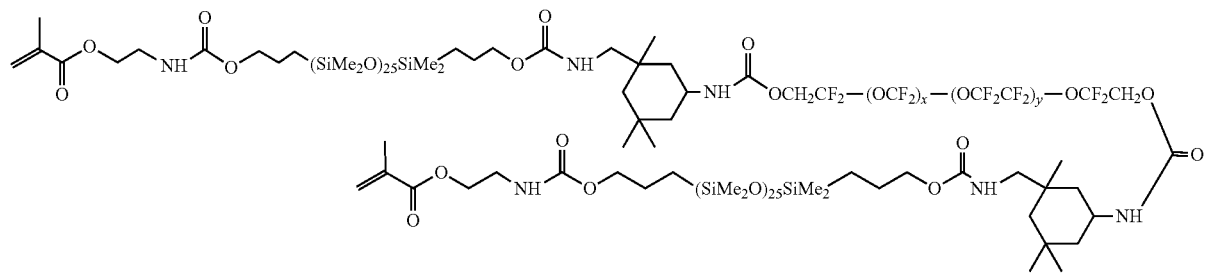

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component in this invention.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention.

Figure 4:
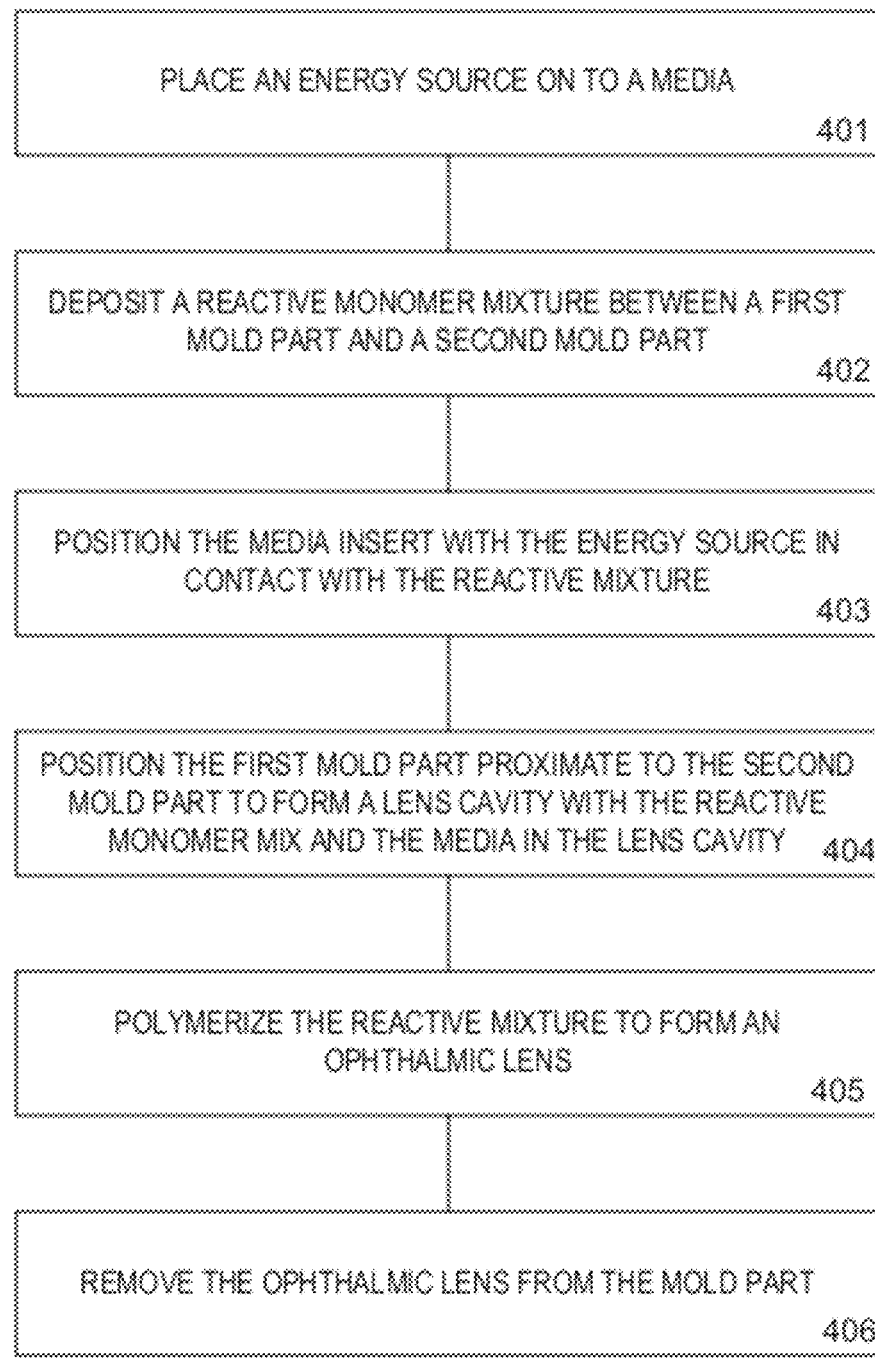
FIG. 4 illustrates method steps according to some embodiments of the present invention.

Referring now to FIG. 4, a flowchart illustrates exemplary steps that may be used to implement the present invention, at 401, an Energy Source is placed on to a Media Insert. The Media Insert may or may not also contain one or more components.

At 402, a reactive monomer mix can be deposited into a first mold part.

At 403, the Media Insert is placed into a cavity formed by the first mold part. In some preferred embodiments, the Media Insert 111 is placed in the mold part 101-102 via mechanical placement. Mechanical placement can include, for example, a robot or other automation, such as those known in the industry to place surface mount components. Human placement of a Media Insert 111 is also within the scope of the present invention. Accordingly, any mechanical placement effective to place a Media Insert 111 with an Energy Source 109 within a cast mold part such that the polymerization of a Reactive Mixture 110 contained by the mold part will include the Energy Source 109 in a resultant ophthalmic lens.

In some embodiments, a processor device, MEMS, NEMS or other component may also be mounted on the Media Insert and be in electrical communication with the Energy Source.

At 404, the first mold part can be placed proximate to the second mold part to form a lens forming cavity with at least suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Referring now again to FIG. 4, at 402, a reactive mixture is placed between a first mold part and a second mold part and at 403, the Media Insert is positioned in contact with the reactive mixture. At 404, the first mold part is placed proximate to a second mold part to form a lens cavity with the reactive monomer mix and the media in the lens cavity.

At 405, the reactive mixture is polymerized, such as for example via exposure to one or both of actinic radiation and heat. At 406, an ophthalmic device incorporating the Media Insert and Energy Source is removed from the mold parts used to form the ophthalmic device.

Referring now to FIG. 5, in another aspect of the present invention, a Media Insert incorporated into an ophthalmic device can be powered via an incorporated Energy Source. At 501, a Media Insert is placed within an ophthalmic lens, as discussed above. At 502, the Media Insert is placed in electrical communication with a component incorporated into the Media Insert or otherwise included in the ophthalmic lens 105. Electrical communication can be accomplished, for example, via circuitry incorporated into the Media Insert or via pathways ink jetted or otherwise formed directly upon lens material.

At 503, energy is directed to a component incorporated into the ophthalmic lens. The energy can be directed, for example, via electrical circuitry capable of conducting the electrical charge. At 504 the component performs some action based upon the energy directed to the component. The action can include a mechanical action affecting the lens or some action processing information including one or more of: receiving, transmitting, storing and manipulating information. Preferred embodiments will include the information being processed and stored as digital values.

At 505, in some embodiments, information can be transmitted from a component incorporated into the lens.

Apparatus

Figure 3:
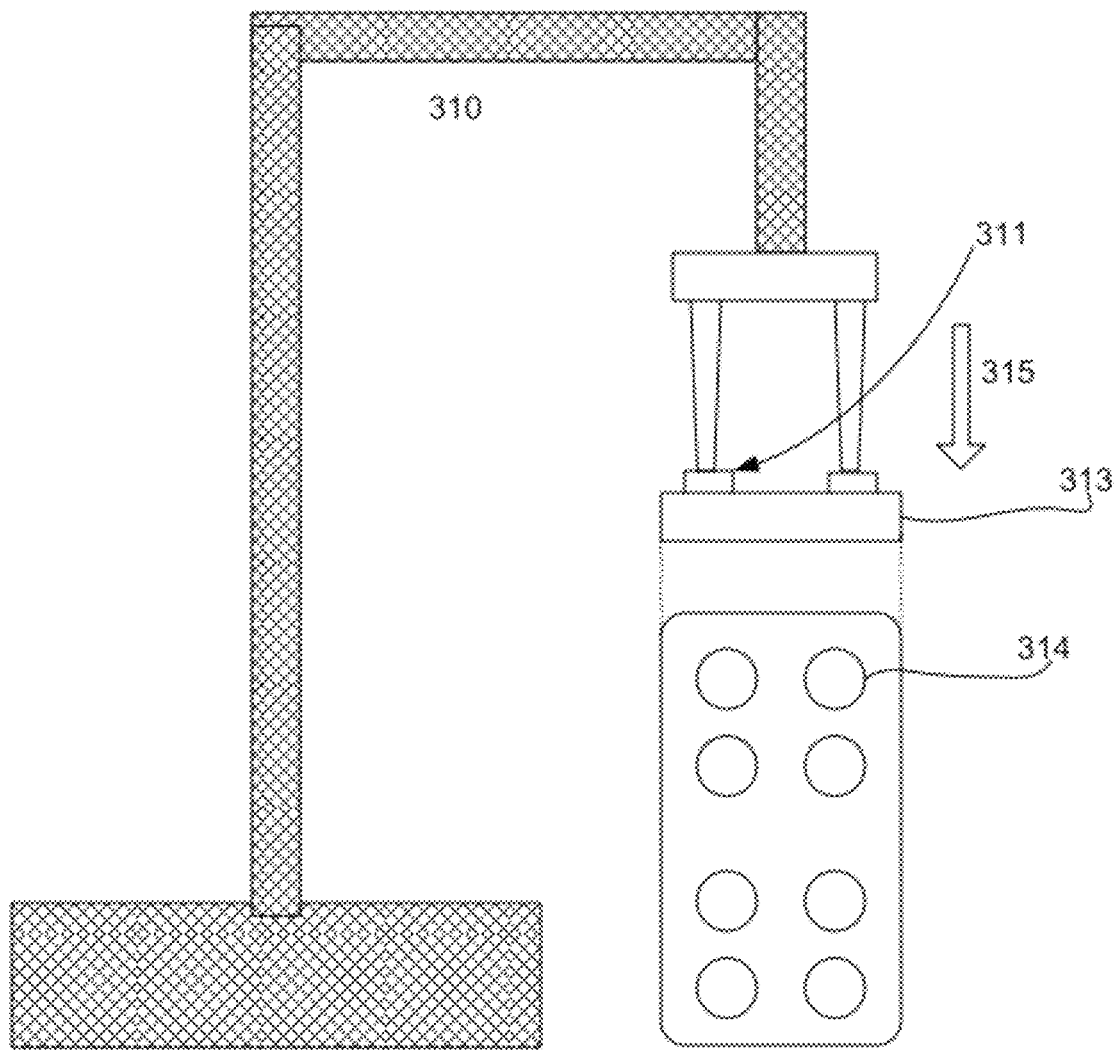
FIG. 3 illustrates an apparatus for placing an Energy Source within an ophthalmic lens mold part.

Referring now to FIG. 3, automated apparatus 310 is illustrated with one or Media Insert 314 transfer interfaces 311. As illustrated, multiple mold parts, each with an associated Media Insert 314 are contained on a pallet 313 and presented to a media transfer interfaces 311 in the direction of arrow 315. Embodiments, can include a single interface individually placing Media Inserts 314, or multiple interfaces (not shown) simultaneously placing Media Inserts 314 in multiple mold parts, and in some embodiments, in each mold.

Another aspect of some embodiments includes apparatus to support the Media Insert 314 while the body of the ophthalmic lens is molded around these components. In some embodiments the Energy Source may affixed to holding points in a lens mold (not illustrated). The holding points may be affixed with polymerized material of the same type that will be formed into the lens body.

Figure 6:
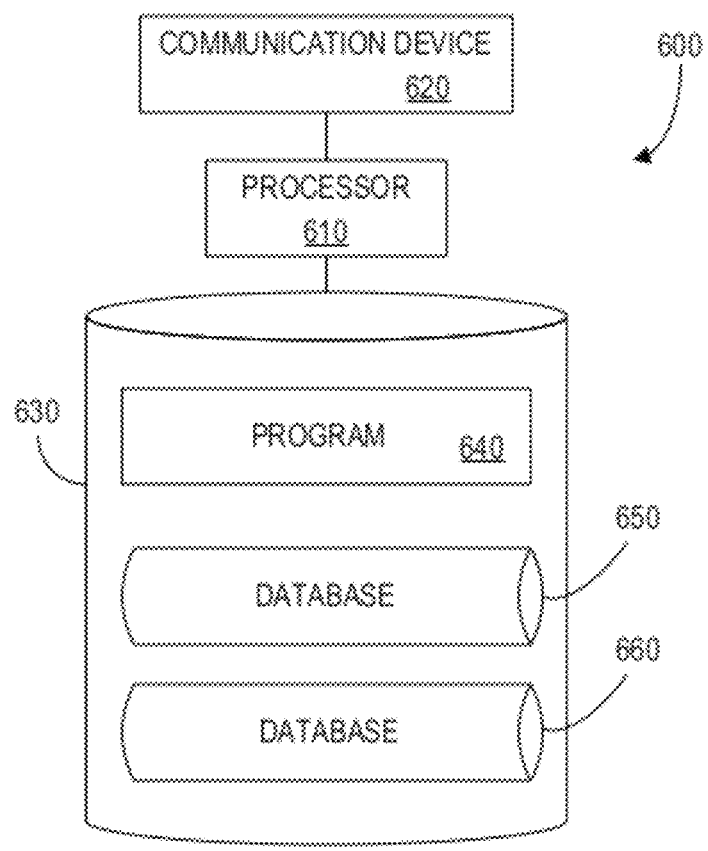
FIG. 6 illustrates a processor that may be used to implement some embodiments of the present invention.

Referring now to FIG. 6 a controller 600 is illustrated that may be used in some embodiments of the present invention. The controller 600 includes one or more processors 610, which may include one or more processor components coupled to a communication device 620. In some embodiments, a controller 600 can be used to transmit energy to the Energy Source placed in the ophthalmic lens.

The processors 610 are coupled to a communication device configured to communicate energy via a communication channel. The communication device may be used to electronically control one or more of: automation used in the placement of a media with an Energy Source into the ophthalmic lens mold part and the transfer of digital data to and from a component mounted on the media and placed within an ophthalmic lens mold part or to control a component incorporated into the ophthalmic lens.

The communication device 620 may also be used to communicate, for example, with one or more controller apparatus or manufacturing equipment components.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a program 640 for controlling the processor 610. The processor 610 performs instructions of a software program 640, and thereby operates in accordance with the present invention. For example, the processor 610 may receive information descriptive of Media Insert placement, component placement, and the like. The storage device 630 can also store ophthalmic related data in one or more databases 650 and 660. The database may include customized Media Insert designs, metrology data, and specific control sequences for controlling energy to and from a Media Insert.

Figure 7:
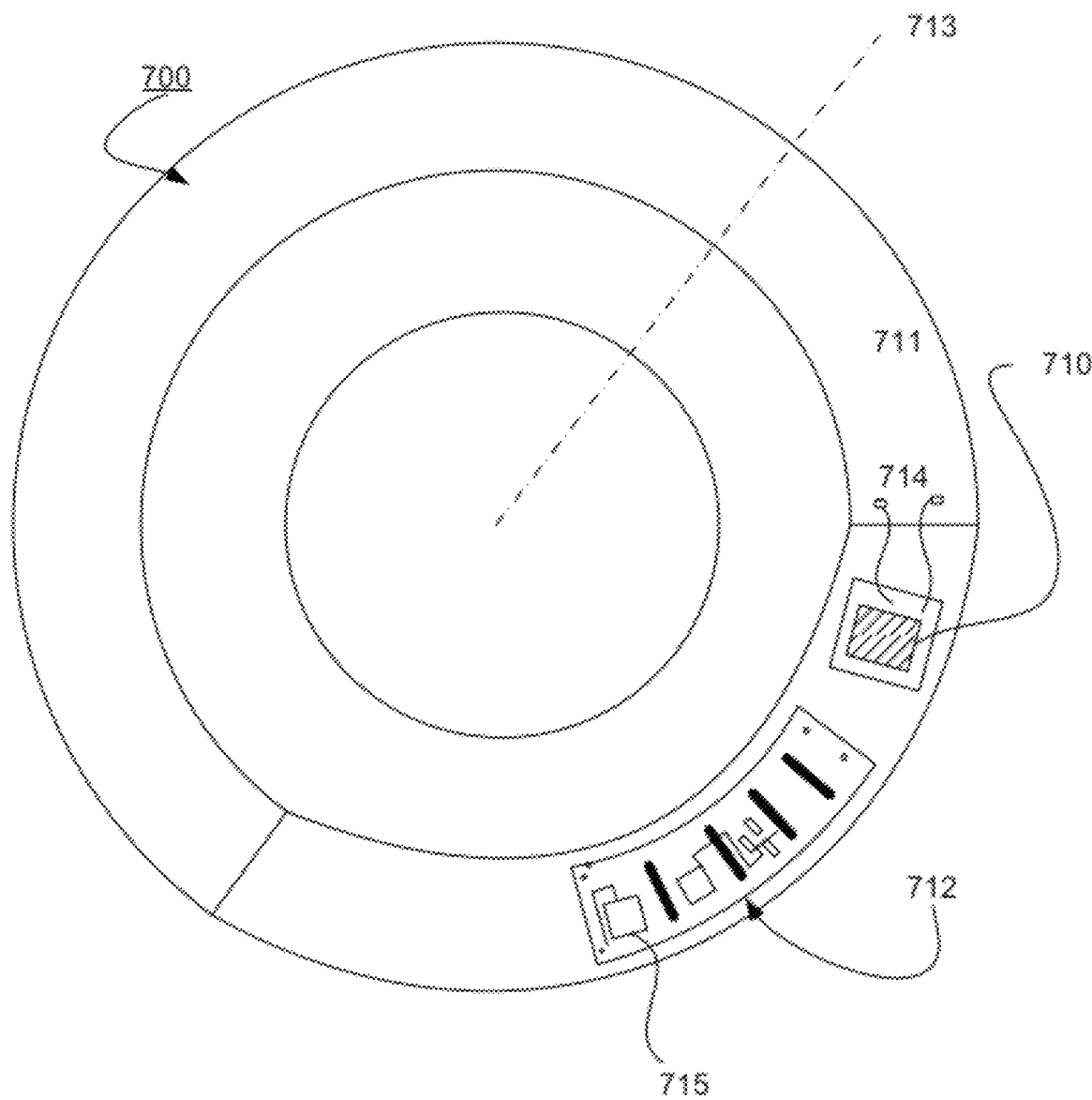
FIG. 7 illustrates a depiction of an exemplary media insert.

Referring to FIG. 7, a top down depiction of an exemplary embodiment of a Media Insert 700 is shown. In this depiction, an Energy Source 710 is shown in a periphery portion 711 of the Media Insert 700. The Energy Source 710 may include, for example, a thin film, rechargeable lithium ion battery. The Energy Source 710 may be connected to contact points 714 to allow for interconnection. Wires may be wire bound to the contact points 714 and connect the Energy Source 710 to a photoelectric cell 715 which may be used to reenergize the battery Energy Source 710. Additional wires may connect the Energy Source 710 to a flexible circuit interconnect via wire bonded contact.

In some embodiments, the Media Insert 700 may include a flexible substrate. This flexible substrate may be formed into a shape approximating a typical lens form in a similar manner previously discussed. However to add additional flexibility, the Media Insert 700 may include additional shape features such as radial cuts along its length. Various electronic components 712 such as integrated circuits, discrete components, passive components and such devices may also be included.

Figure 8:
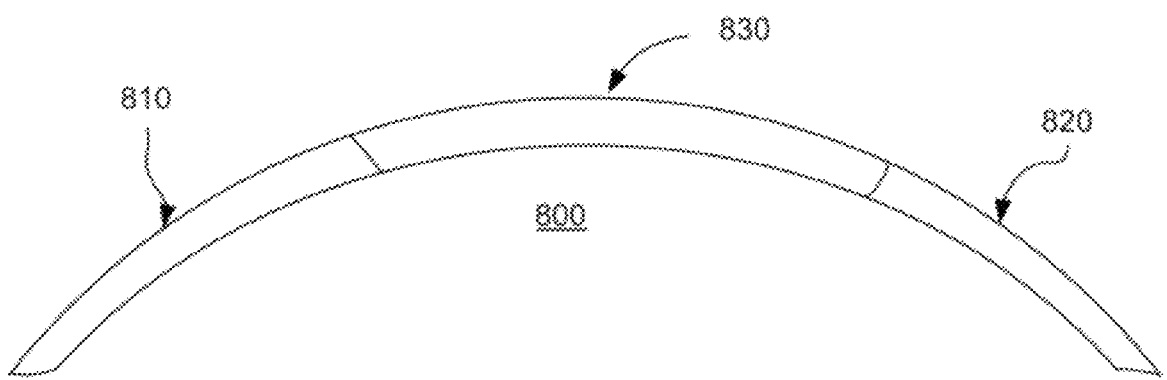
FIG. 8 illustrates a cross section of an exemplary media insert.

An optic zone 713 is also illustrated. The optic zone may be optically passive with no optical change, or it may have a predetermined optical characteristic, such as a predefined optical correction. Still other embodiments include an optical zone with a variable optic component that may be varied on command, Referring now to FIG. 8, a cross sectional of a Media Insert 800 is illustrated. The Media Insert 800 can include an optic zone 830 as discussed above and also one or more periphery portions 810-820. In preferred embodiments, the media insert and components will be placed within the periphery portions 810-820.

In some embodiments there may be manners of affecting the ophthalmic lens' appearance. Aesthetics of the thin film microbattery surface may be altered in various manners which demonstrate a particular appearance when embedded in the electroactive contact lens or shaped hydrogel article. In some embodiments the thin film microbattery may be produced with aesthetically pleasing patterned and/or colored packaging materials which could serve to either give a muted appearance of the thin film microbattery or alternatively provide iris-like colored patterns, solid and/or mixed color patterns, reflective designs, iridescent designs, metallic designs, or potentially any other artistic design or pattern. In other embodiments, the thin film battery may be partially obscured by other components within the lens, for example a photovoltaic chip mounted to the battery anterior surface, or alternatively placement of the battery behind all or a portion of a flexible circuit. In further embodiments, the thin film battery may be strategically located such that either the upper or lower eyelid partially or wholly obscures the visibility of the battery. It may be apparent to one skilled in the art that there are numerous embodiments relating to appearance of an energized ophthalmic device and the methods to define them.

There may be numerous embodiments relating to the method of forming an energized ophthalmic device of the various types that have been described. In one set of embodiments, the inventive art herein may include assembling subcomponents of a particular energized ophthalmic lens embodiment in separate steps. The "off-line" assembly of advantageously shaped thin film microbatteries, flexible circuits, interconnects, microelectronic components, and/or other electroactive components in conjunction with a biocompatible, inert, conformal coating to provide an all-inclusive, embeddable singular package that can be simply incorporated into standard contact lens manufacturing processes. Flexible circuits may include those fabricated from copper clad polyimide film or other similar substrates. Conformal coatings may include, but are not limited to, parylene (grades N, C, D, HT, and any combinations thereof), poly(p-xylylene), dielectric coatings, silicone conformal coatings, or any other advantageous biocompatible coatings.

Some embodiments of the present invention may be methods that are directed toward the geometric design of thin film microbatteries in geometries amenable to the embedment within and/or encapsulation by ophthalmic lens materials.

Other embodiments may involve methods that incorporate thin film microbatteries in various materials such as, but not limited to, hydrogels, silicone hydrogels, rigid gas-permeable "RGP" contact lens materials, silicones, thermoplastic polymers, thermoplastic elastomers, thermosetting polymers, conformal dielectric/insulating coatings, and hermetic barrier coatings.

Other embodiments may involve methods for the strategic placement of an Energy Source within an ophthalmic lens geometry. Specifically, in some embodiments the Energy Source may be an opaque article. Since the Energy Source may not obstruct the transmission of light through the ophthalmic lens, methods of design in some embodiments may ensure that the central 5-8 mm of the contact lens may not be obstructed by any opaque portions of the Energy Source. It may be apparent to one skilled in the art that there may be many different embodiments relating to the design of various Energy Sources to interact favorably with the optically relevant portions of the ophthalmic lens.

In some embodiments the mass and density of the Energy Source may facilitate designs such that said Energy Source may also function either alone or in conjunction with other lens stabilization zones designed into the body of the ophthalmic lens to rotationally stabilize the lens while on eye. Such embodiments could be advantageous for a number of applications including, but not limited to, correction of astigmatism, improved on-eye comfort, or consistent/controlled location of other components within the energized ophthalmic lens.

In additional embodiments, the Energy Source may be placed a certain distance from the outer edge of the contact lens to enable advantageous design of the contact lens edge profile in order to provide good comfort while minimizing occurrence of adverse events. Examples of such adverse events to be avoided may include superior epithelial arcuate lesions or giant papillary conjunctivitis.

By way of non-limiting example in some embodiments, a cathode, electrolyte and anode features of embedded electrochemical cells may be formed by printed appropriate inks in shapes to define such cathode, electrolyte and anode regions. It may be apparent that batteries thus formed could include both single use cells, based for example on manganese oxide and zinc chemistries, and rechargeable thin batteries based on lithium chemistry similar to the above mentioned thin film battery chemistry. It may be apparent to one skilled in the arts that a variety of different embodiments of the various features and methods of forming energized ophthalmic lenses may involve the use of printing techniques.

In addition, in some embodiments, energy harvesters may be included and placed in electrical communication in a fashion which enables the energy harvesters to charge one or more Energy Sources. Energy harvesters can include, for example: photovoltaic energy cells, thermoelectric cells or piezoelectric cells. Harvesters have a positive aspect in that they can absorb energy from the environment and then can provide electrical energy without an external wired connection. In some embodiments, harvesters may comprise an energy source in an energized ophthalmic lens. In other embodiments, however, the energy harvester may be combined with other sources that can store energy in an electrical form.

Other types of Energy Source include the use of capacitor type devices. It may be apparent, that capacitors may provide an energy density solution that is higher than energy harvesters but less than that of batteries.

Capacitors are a type of Energy Source that stores energy in an electrical form and therefore, may be one of the Energy Sources that can be combined with energy harvesters to create a wireless Energy Source that is capable of storage of energy. Generally capacitors have an advantage over batteries in that they have higher power density, in general, than batteries. There are many different types of capacitors ranging from standard electrical thin film capacitors, Mylar capacitors, electrolytic capacitors and relative newer and more advanced technologies of high-density nanoscale capacitors or supercapacitors.

In some additional embodiments, Energy Sources including electrochemical cells or batteries may define a relatively desirable operational point. Batteries have numerous advantageous characteristics. For example, batteries store energy in a form that is directly converted to electrical energy. Some batteries may be rechargeable or Re-energizable and therefore, represent another category of Energy Source that may be coupled to energy harvesters. Batteries generally are capable of relatively high energy density, and the energy batteries store can perform functions with relatively higher energy requirements as compared with other miniaturized Energy Sources. In addition, the batteries can be assembled into forms that are flexible. For applications requiring high power capabilities, it may be apparent to one skilled in the art that a Battery may also be coupled to Capacitors. There may be numerous embodiments that comprise a battery at least as part of an Energy Source in an energized ophthalmic lens.

Another type of embodiment can include a fuel cell as an Energy Source. Fuel cells generate electricity by consuming a chemical fuel source which then generates electricity and byproducts including heat energy. Fuel cell embodiments may be possible using biologically available materials as the fuel source.

There are many different types of batteries which may be included in embodiments of energized ophthalmic lenses. For example, single use batteries may be formed from various cathode and anode materials. By way of non-limiting examples these materials may include one or more of: Zinc, carbon, Silver, Manganese, Cobalt, Lithium and Silicon. Still other embodiments may derive from the use of batteries that are rechargeable. Such batteries may in turn be made of one or more of: Lithium Ion technology; Silver Technology; Magnesium technology; Niobium technology or other current providing material. It may be apparent to one skilled in the art that various current battery technologies for single use or rechargeable battery systems may comprise the Energy Source in various embodiments of an energized ophthalmic lens.

In some embodiments, the physical and dimensional constraints of a contact lens environment may be conducive to thin film batteries. Thin film batteries may occupy the small volume of space consistent with human ophthalmic embodiments. Furthermore, they may be formed upon a substrate that is flexible allowing for the body of both the ophthalmic lens and included battery with substrate to have freedom to flex.

In the case of thin film batteries, examples may include single charge and rechargeable forms. Rechargeable batteries afford the ability of extended usable product lifetime and, therefore, higher energy consumption rates. Much development activity has focused on the technology to produce electrically energized ophthalmic lenses with rechargeable thin film batteries; however, the inventive art is not limited to this subclass.

Rechargeable thin film batteries are commercially available, for example, Oak Ridge National Laboratory has produced various forms since the early 1990s. Current commercial producers of such batteries include Excellatron Solid State, LLC (Atlanta, Ga.), Infinite Power Solutions (Littleton, Colo.), and Cymbet Corporation, (Elk River, Minn.). The technology is currently dominated by uses that include flat thin film batteries. Use of such batteries may comprise some embodiments of this inventive art; however, forming the thin film battery into a three dimensional shape, for example with a spherical radius of curvature comprises desirable embodiments of the inventive art. Numerous shapes and forms of such a three dimensional battery embodiment are within the scope of the invention.

Stacked Integrated Component Media Inserts

In other embodiments, the thin film batteries and/or the energized electronic elements may be included into the media insert in the form of stacked integrated components. Proceeding to FIG. 9, item 900, an illustration of a cross section of this embodiment type is provided in a non-limiting example. In embodiments of this type, the media insert may include numerous layers of different types which are encapsulated into forms consistent with the ophthalmic environment that they will occupy. In some embodiments, these inserts with stacked integrated component layers may assume the entire insert shapes as depicted in the various exemplary shapes in FIGS. 2A, 2B, 2C and 2D. Alternatively in some cases, the media insert may assume these shapes whereas the stacked integrated component may occupy just a portion of the volume within the entire shape.

Figure 9:
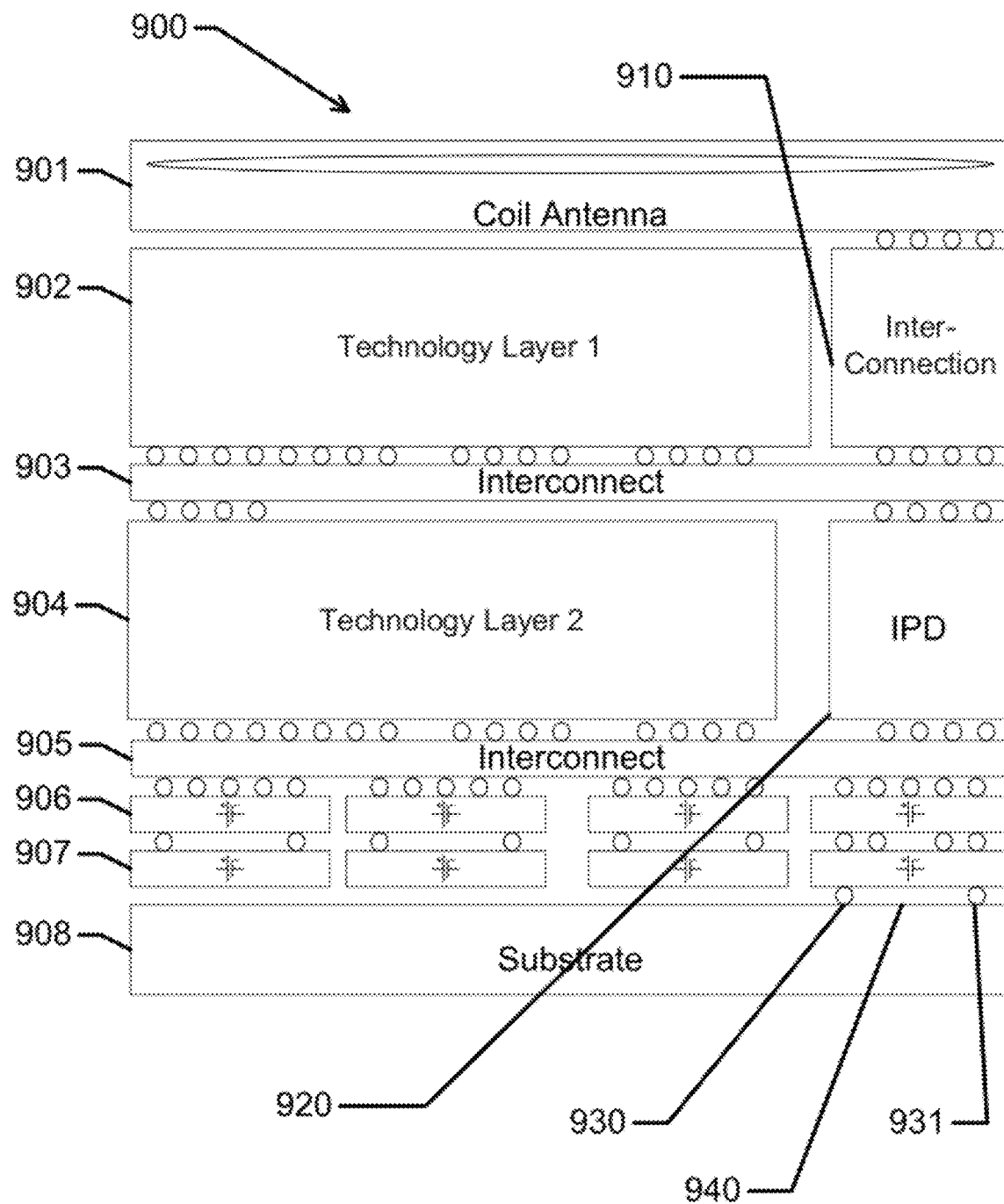
FIG. 9 illustrates a cross section of a Stacked Integrated Component Device with energization that may be used in some exemplary embodiments of stacked integrated component media inserts.

Continuing with the example of item 900, a stacked integrated component media insert may assume numerous functional aspects. As shown in FIG. 9, the thin film batteries, in some embodiments, may comprise one or more of the layers that are stacked upon each other, in this case layers 906 and 907 may represent the battery layers, with multiple components in the layers. One such battery component may be found as item 940. As can be seen in nearly all of the layers, there may be interconnections that are made between two layers that are stacked upon each other. In the state of the art there may be numerous manners to make these interconnections, however as demonstrated by items 930 and 931, the interconnection may be made through solder ball interconnections between the layers 907 and 908. In some cases only these connections may be required, however in other cases the solder balls may contact other interconnection elements, as for example with through layer vias. In the component in layer 907 which has interconnections 930 and 931, there may be a through substrate via in the body of the thin film battery component that passes electrical connection from one side of the component to another side. Some of these thru substrate components may then, on the alternative side of the substrate, make another interlayer connection to a layer above the component, as may be the case for component 940.

In other layers of the Stacked Integrated Component media insert, a layer dedicated to interconnection of various components in the interconnect layers may be found, as for example layer 905. This layer may contain vias and routing lines that pass signals from various components to others. For example, 905 may provide the various battery elements connections to a power management unit that may be present in the technology layer components of layer 904. As well the interconnection layer may make connections between components in the technology layer and also components outside the technology layer ; as may exist for example in the Integrated Passive Device component shown as item 920. There may be numerous manners that routing of electrical signals may be supported by the presence of dedicated interconnect layers.

There are two features identified as technology layers, items 904 and 902. These features represent a diversity of technology options that may be included in media inserts. In some embodiments, one of the layers may include CMOS, BiCMOS, Bipolar, or memory based technologies whereas the other layer may include a different technology. Alternatively, The two layers may represent different technology families within a same overall family; as for example layer 902 may include electronic elements produced using a 0.5 micron CMOS technology and layer 904 may include elements produced using a 20 nanometer CMOS technology. It may be apparent that many other combinations of various electronic technology types would be consistent within the art described herein.

In some embodiments, additional interconnection layers similar to layer 905 may be present. In some such embodiments, the additional layer may be another full layer of interconnection as depicted in item 903. Alternatively, the additional layer may be a portion of a stacked layer as shown in item 910. In some cases these additional elements may provide electrical interconnection, in others there may be structural interconnection performed by the presence of the layer. Still further embodiments may include both structural and electronic interconnection between the various layers.

In some embodiments, the media insert may include locations for electrical interconnections to components outside the insert as has been described previously. In other examples, however the media insert may also include interconnection to external components in a wireless manner. In such cases, the use of antennas may provide exemplary manners of wireless communication. In some such embodiments, a layer may exist, as shown as item 901, where such an exemplary antenna may be supported in the layer. In many cases, such an antenna layer may be located on the top or bottom of the stacked integrated component device within the media insert. As shown in item 908, it is possible for such a layer on the top or bottom to also not include an antenna for wireless communication and therefore act as a supporting substrate upon which the stacked device is produced.

In some of the embodiments discussed herein, the battery elements may be included as elements in at least one of the stacked layers themselves. It may be noted as well that other embodiments may be possible where the battery elements are located externally to the stacked integrated component layers. Still further diversity in embodiments may derive from the fact that a separate battery or other energization component may also exist within the media insert, or alternatively these separate energization components may also be located externally to the media insert.

Figure 10:
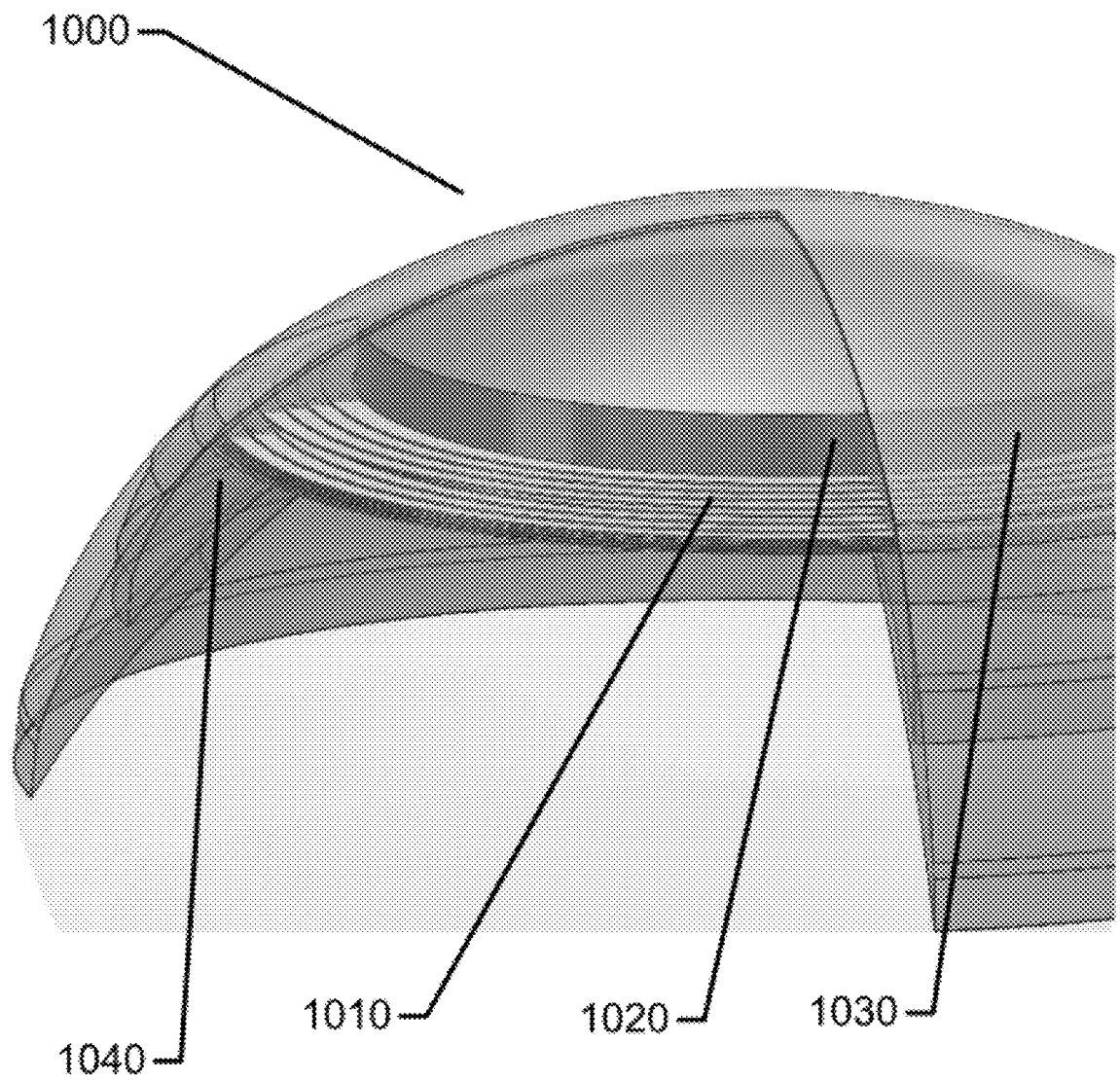
FIG. 10 illustrates a stacked integrated component media insert within an exemplary Ophthalmic Lens.

Proceeding to FIG. 10, item 1000, an exemplary embodiment of a stacked integrated component media insert, item 1040, within an ophthalmic lens, item 1030, is depicted. The boundary of the media insert material is depicted by the feature labeled 1040. Within the bounds of the media insert, in this example, is located an embodiment of stacked integrated component layers depicted as item 1010. In some embodiments of this type, external to the media insert but within the ophthalmic lens, 1030, an electro active lens may be represented as item 1020. The control signals for the components within the lens may originate from a wireless signal as discussed earlier. And, the stacked component layers within the media insert may receive this wireless signal and in some cases adjust an electrical signal that is routed on wires that run externally to the media insert, 1040, connecting to the electroactive lens 1020. It may be apparent that there may be many alternatives to using and connecting a media insert which contains stacked integrated components within an ophthalmic lens and that the art may include embodiments in devices other than ophthalmic lenses as well including in a non-limiting sense, energized biomedical devices of various kinds.

Figure 11:
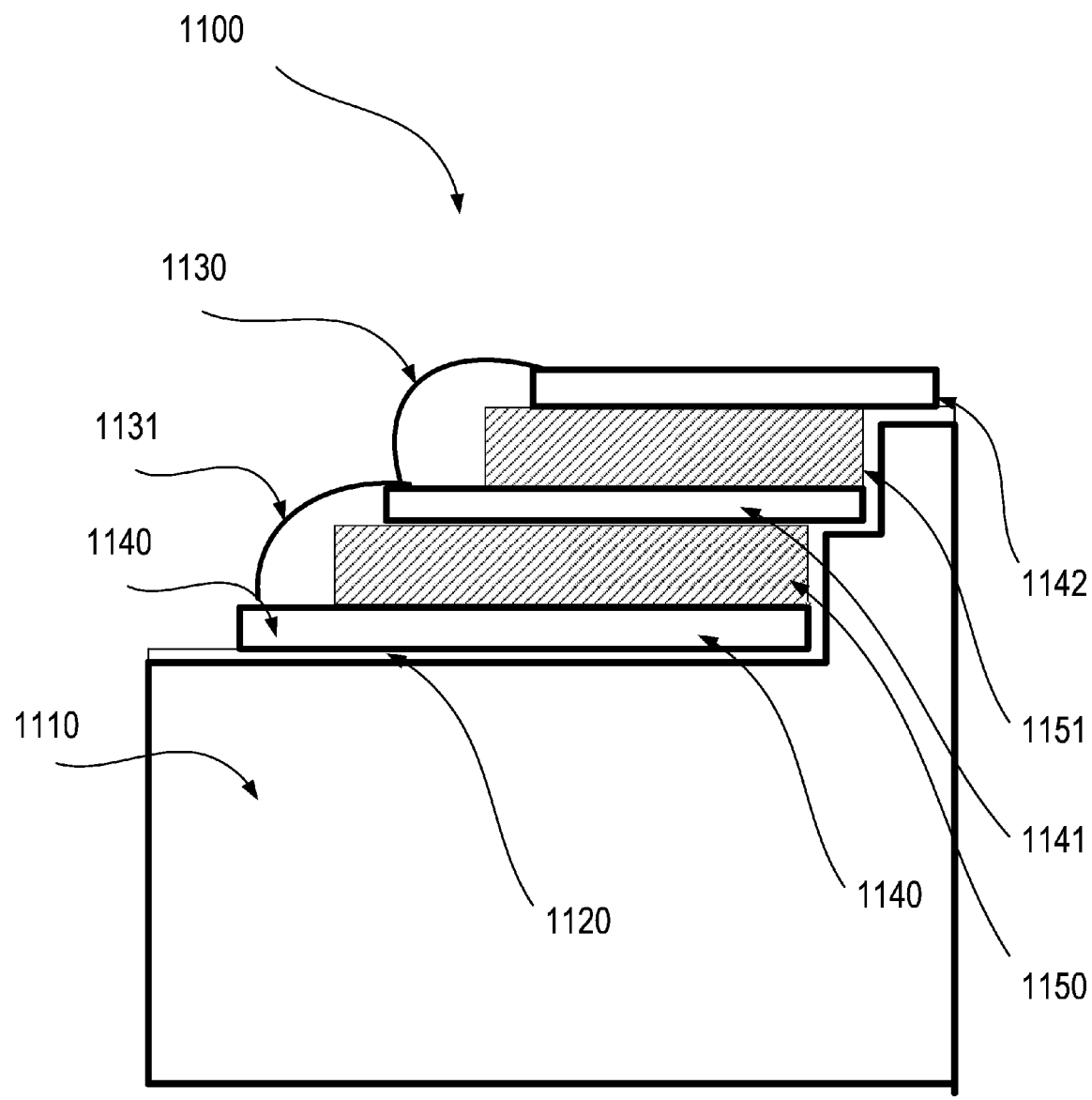
FIG. 11 illustrates an exemplary embodiment of an insert comprising multiple stacked functional layers upon a supporting and aligning feature.

Proceeding to FIG. 11, item 1100, a close up view of an exemplary apparatus to assemble stacked functionalized layer inserts is demonstrated. In the example, a stacking technique where the stacked layers do not align on either side of the layer is shown. Items 1140, 1141 and 1142 again may be silicon layers. On the right side of the FIG. it can be seen that the right side edge of the items 1140, 1141 and 1142 do not align with each other, as they may in alternative embodiments. Such a stacking methodology may allow the insert to assume a three dimensional shape similar to that of the general profile of an ophthalmic lens. In some embodiments as well, such a stacking technique may allow for the layers to be made from the largest surface area as possible. In layers that are functional for energy storage and circuitry such surface area maximization may be important.

In general many of the features of the previously described stacked inserts may be observed in FIG. 11 including stacked functional layers 1140, 1141 and 1142; stacked insulating layers 1150 and 1151; and interconnections 1130 and 1131. Additionally a supporting jig, item 1110, may be observed to support the stacked functionalized layer insert as it is being assembled. It may be apparent that the surface profile of item 1110 may assume a large number of shapes which will change the three dimensional shape of inserts made thereon.

In general, a jig 1110 may be provided with a predetermined shape. It may be coated with different layers, item 1120, for a number of purposes. In a non-limiting exemplary sense, the coating may first comprise a polymer layer that will allow easy incorporation of an insert into the base material of an ophthalmic lens, and may even be formed from a polysilicone material in some embodiments. An epoxy coating may then be deposited upon the polysilicone coating to adhere the bottom thin functional layer 1140 to the coating 1120. The bottom surface of a next insulating layer 1150 may then be coated with a similar epoxy coating and then placed into its appropriate location upon the jig. It may be clear that the jig may in some embodiments have the function of aligning the correct placement of the stacked layers relative to each other as the device is assembled. In repetitious fashion, the rest of the insert may then be assembled, the interconnections defined and then the insert encapsulated. In some embodiments, the encapsulated insert may then be coated from the top with a polysilicone coating. In some embodiments that use a polysilicone coating for item 1120, the assembled insert may be dissociated from the jig 1110 by hydration of the polysilicone coating.

The jig 1110 may be formed from numerous materials. In some embodiments, the jig may be formed and made of similar materials that are used to make molding pieces in the manufacture of standard contact lenses. Such a use could support the flexible formation of various jig types for different insert shapes and designs. In other embodiments the jig may be formed from materials that either in their own right or with special coatings will not adhere to the chemical mixtures used to adhere the different layers to each other. It may be apparent that numerous options may exist for the configuration of such a jig.

Another aspect of the jig demonstrated as item 1110 is the fact that its shape physically supports the layers upon it. In some embodiments the interconnection between the layers may be formed by wire bonding connection. In the process of wire bonding significant force is applied the wire to ensure it forms a good bond. Structural support of the layers during such bonding could be important and could be performed by the supporting jig 1110. Still another function of the jig demonstrated as item 1110 is that the jig may have alignment features on it that allow for the alignment of pieces of the functionalized layers to be aligned both relative to each other linearly and radially along the surfaces. In some embodiments, the jig may allow the alignment of azimutal angle of the functional layers relative to each other around a center point. Regardless of the ultimate shape of the insert produced it may be apparent that the assembly jib may be useful in insuring that the pieces of the insert are properly aligned for their function and correct interconnection.

Figure 12:
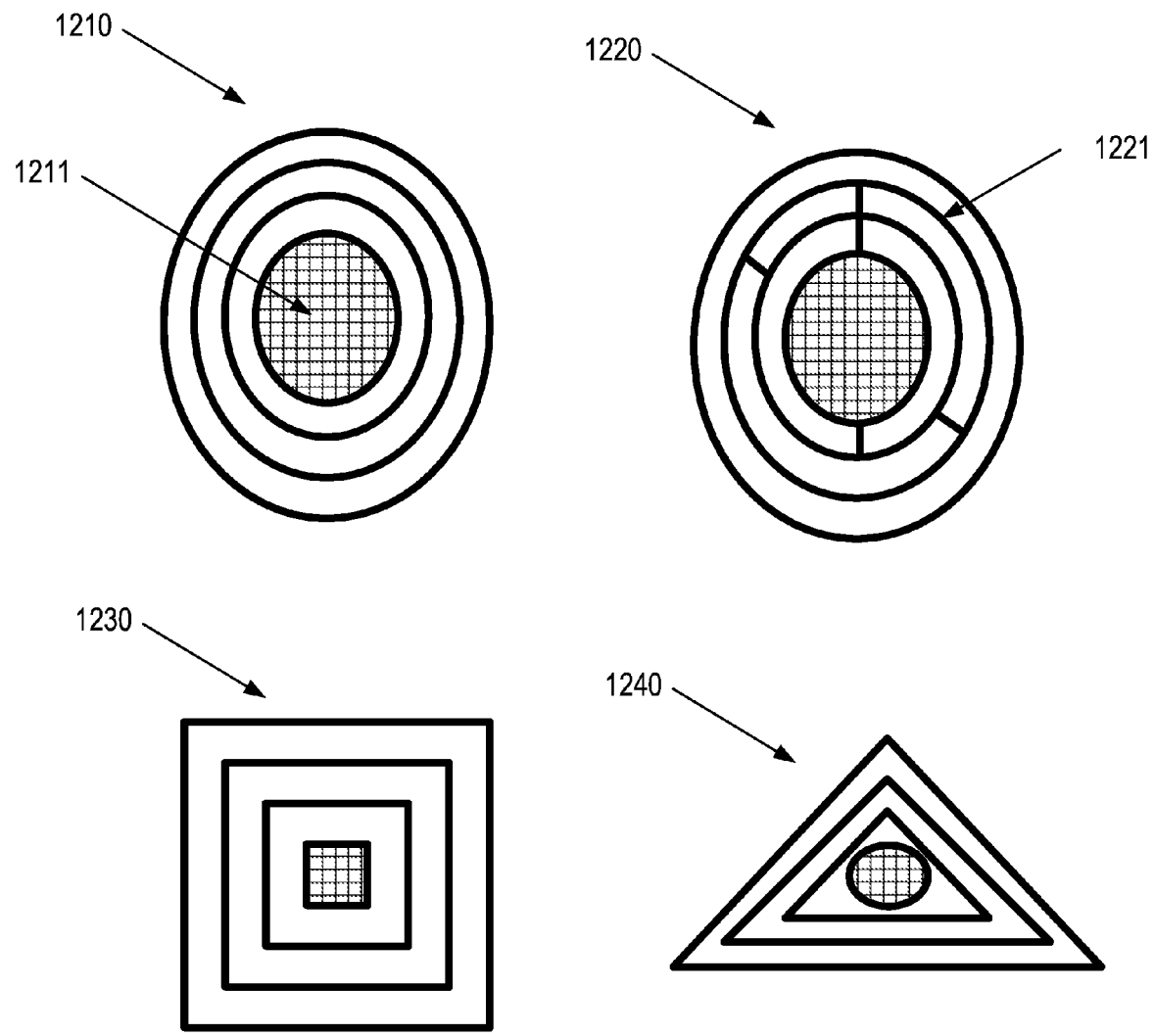
FIG. 12 illustrates different shapes and embodiments of the components used for forming layers in a stacked functional layer insert.

Proceeding to FIG. 12, a more generalized discussion of shapes of stacked layer inserts may be had. In a subset of the generality of shapes consistent with the art, some sample variation in shape is shown. For example, item 1210 shows a top view of a stacked insert which has been formed from essentially circular layer pieces. In some embodiments, the region shown with cross hatching 1211 may be an annular region where layer material has been removed. However, in other embodiments, it may be apparent that the pieces of the stacked layers used form the insert could be disks without an annular region. Although, such a non-annular insert shape may be of limited utility in an ophthalmic application the spirit of the inventive art herein is not intended to be limited by the presence of an internal annulus.

Item 1220 may in some embodiments demonstrate different embodiments of a stacked functional layer insert. As shown in item 1221, in some embodiments the layer pieces may be discrete not only in the stacking direction but also around the azimuthal direction perpendicular to the stacking direction. In some embodiments, semicircular pieces may be used to form the insert. It may be apparent that in shapes that have an annular region, which partial shapes could be useful to reduce the amount of material that would need to be "diced" or cut out after the layer material is formed into its function.

Proceeding further, item 1230 demonstrates that non radial, non-elliptical and non-circular insert shapes could be defined. As shown in item 1230, rectilinear shapes may be formed, or as in item 1240 other polygonal shapes. In a three dimensional perspective pyramids, cones and other geometrical shapes could result from the different shapes of the individual layer pieces used to form the insert. In a more general sense it may be apparent to one skilled in the arts that a vast diversity of shapes may be formed into shapes and products to make or discuss the more general case of shapes that can be made with the functionality, energization, activation etc.

Conclusion

The present invention, as described above and as further defined by the claims below, provides methods of providing energized Media Inserts and apparatus for implementing such methods, as well as ophthalmic lenses formed with the Media Inserts.

The invention claimed is:

1. An apparatus for manufacturing a stacked integrated component media insert for an ophthalmic lens from a plurality of thin component layers, the apparatus comprising:
   a rigid body in a generally conical shape; and
   a plurality of exposed, vertically spaced and inwardly offset shelves on the surface of the rigid body that provide a series of non-overlapping stepped supports to orient and support the thin component layers in a partially overlapping configuration for consolidation into a stacked integrated component media insert having a three-dimensional shape designed to fit within a structure of an ophthalmic lens,
   wherein the plurality of shelves comprises a first shelf and a second shelf spaced above and inwardly offset from said first shelf, wherein the second shelf has a height above the first shelf approximately equal to the thickness of the thin component layers placed upon the first shelf and a width that is less than the width of the thin component layer placed on said second shelf, such that said thin component layer on said second shelf overlies and is partially supported by the thin component layer placed on said first shelf.

2. The apparatus of claim 1, wherein at least a portion of the rigid body is coated with a non-adherent surface film.

3. The apparatus of claim 2, wherein the non-adherent surface film is a polytetrafluoroethylene formulation.

4. The apparatus of claim 1, additionally comprising automation for placing the thin component layers upon the shelves in the rigid body.

5. The apparatus of claim 4, additionally comprising:
a processor for controlling the automation; and
a digital storage device comprising software executable upon demand,
wherein said software is operative with the processor to place the layered pieces into a mold part.

6. The apparatus of claim 5, wherein the processor is adapted to receive a plurality of programmed command sets from a network in logical connection with said processor.

7. The apparatus of claim 1, wherein the lens is one of an intraocular lens and a contact lens.

8. The apparatus of claim 1, further comprising a plurality of alignment features along an azimuth of the rigid body.

\* \* \* \* \*